United States Patent
Matsuda et al.

(10) Patent No.: US 6,928,306 B2
(45) Date of Patent: Aug. 9, 2005

(54) PORTABLE MOBILE UNIT

(75) Inventors: Masayuki Matsuda, Tokyo (JP);
Tomohiro Esaki, Tokyo (JP);
Kazuyuki Takizawa, Tokyo (JP); Akio Shinagawa, Tokyo (JP); Chikako Takada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 575 days.

(21) Appl. No.: 09/755,878

(22) Filed: Jan. 4, 2001

(65) Prior Publication Data

US 2001/0014616 A1 Aug. 16, 2001

(30) Foreign Application Priority Data

Jan. 7, 2000 (JP) ........................................ 2000-005858

(51) Int. Cl.$^7$ ................................................. H04B 1/38
(52) U.S. Cl. ....................................... 455/567; 455/418
(58) Field of Search ................................ 455/567, 450, 455/564, 418, 90, 189.1, 209, 326; 381/24; 379/88.19, 252, 418; 84/615

(56) References Cited

U.S. PATENT DOCUMENTS

| | | | | |
|---|---|---|---|---|
| 5,563,951 A | * | 10/1996 | Wang et al. | 455/100 |
| 5,771,001 A | * | 6/1998 | Cobb | 340/573.1 |
| 5,870,684 A | * | 2/1999 | Hoashi et al. | 455/567 |
| 6,175,721 B1 | * | 1/2001 | Hayato | 340/7.58 |
| RE37,281 E | * | 7/2001 | Motegi | 340/636.15 |
| 6,308,086 B1 | * | 10/2001 | Yoshino | 455/567 |
| 6,463,278 B2 | * | 10/2002 | Kraft et al. | 455/418 |
| 2001/0051536 A1 | * | 12/2001 | Muramatsu | 455/567 |
| 2003/0110928 A1 | * | 6/2003 | Yamaki et al. | 84/615 |

* cited by examiner

*Primary Examiner*—Nay Maung
*Assistant Examiner*—Tu X Nguyen
(74) *Attorney, Agent, or Firm*—Townsend and Townsend and Crew LLP

(57) ABSTRACT

A portable mobile unit for alerting on incoming of a signal by a ringing sound, comprises: a ringing sound generator for generating the ringing sound in a plurality of patterns; and a controller for controlling operations of the portable mobile unit, wherein the controller select one pattern from the a plurality of patterns based on conditions which are set up in advance, when the signal comes in, so as to control the ringing sound generator to generate the ringing sound for alerting a user of the incoming call, thereby providing the portable mobile unit being superior in the usability, with which various conditions can be grasped by means of change in the ringing sound when the telephone call comes in, while achieving the discrimination of the ringing sound for alerting of the incoming call.

15 Claims, 8 Drawing Sheets

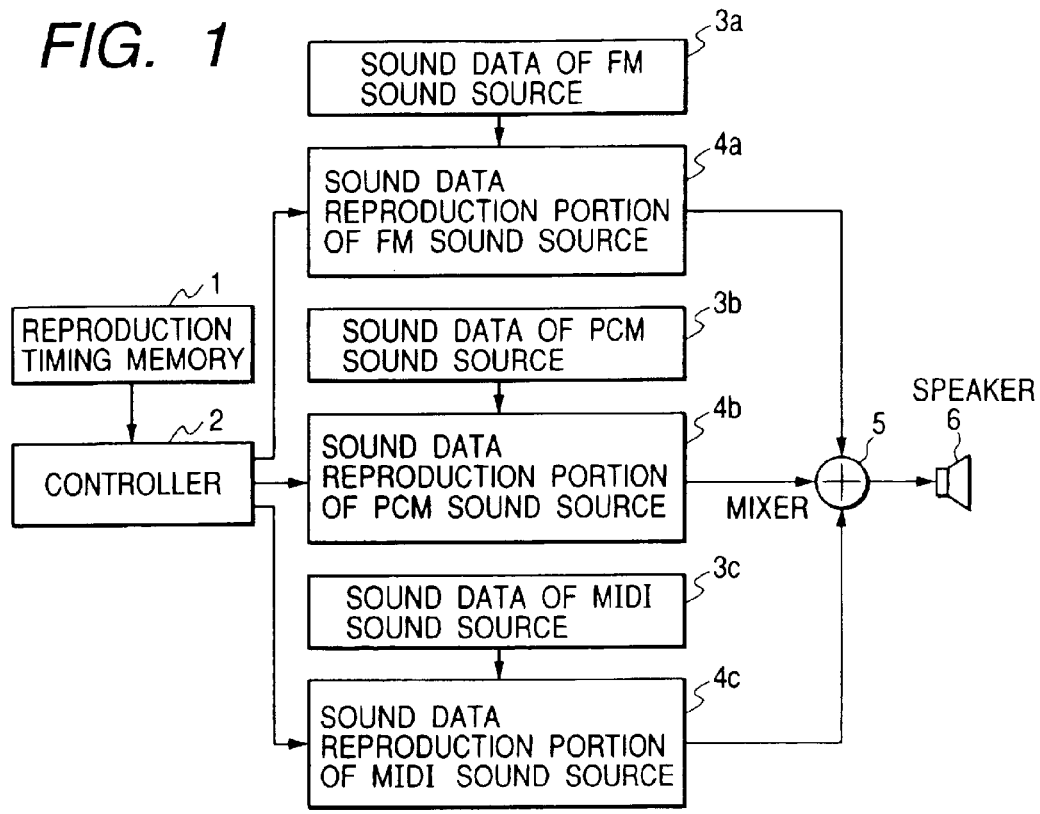

FIG. 3
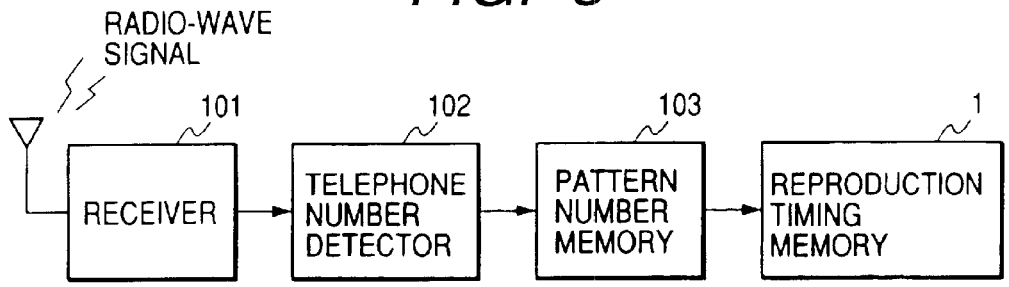
FIG. 4
PATTERN NUMBER MEMORY
| TELEPHONE NUMBER | PATTERN NUMBER | |
|---|---|---|
| 012-345-6789 | 1 | ← 103a |
| 090-1234-5678 | 2 | ← 103b |
| UPPER 3 DIGITS 045 | 3 | ← 103c |
| UPPER 4 DIGITS 0965 | 4 | ← 103d |
| ⋮ | ⋮ | |
FIG. 5
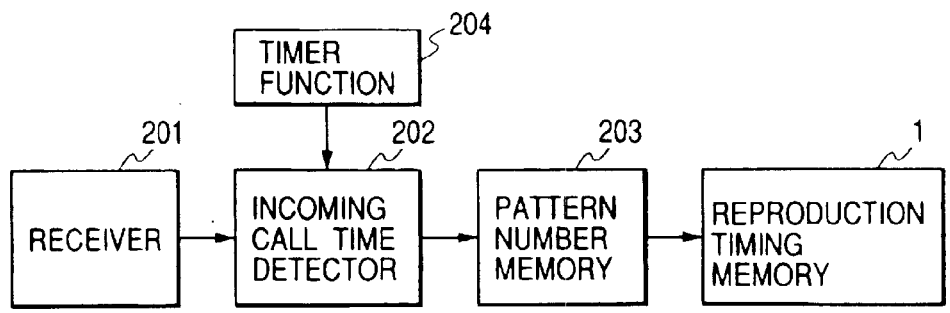

PATTERN NUMBER MEMORY

| SET-UP TIME | PATTERN NUMBER | |
|---|---|---|
| 0:00 ~ 8:00 | 1 | — 203a |
| 17:15 ~ 21:30 | 2 | — 203b |
| ⋮ | ⋮ | |

PATTERN NUMBER MEMORY

| INCOMING CALL NUMBER | PATTERN NUMBER | |
|---|---|---|
| 1st TIME | 1 | — 303a |
| 2nd TIME | 2 | — 303b |
| 3rd TIME | 3 | — 303c |
| ⋮ | ⋮ | |

FIG. 9
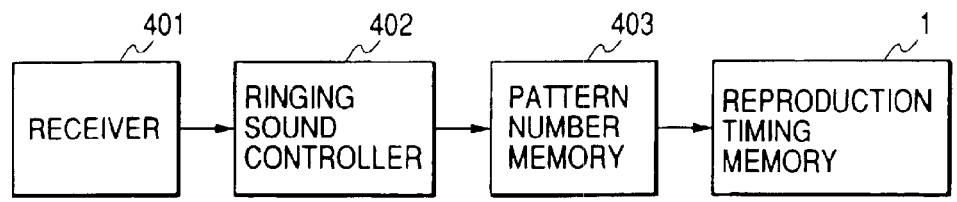
FIG. 10
PATTERN NUMBER MEMORY
| MODE | PATTERN NUMBER | |
|------|----------------|---|
| 1 | 1 | — 403a |
| 2 | 2 | — 403b |
| 3 | 3 | — 403c |
| ⋮ | ⋮ | |
FIG. 11
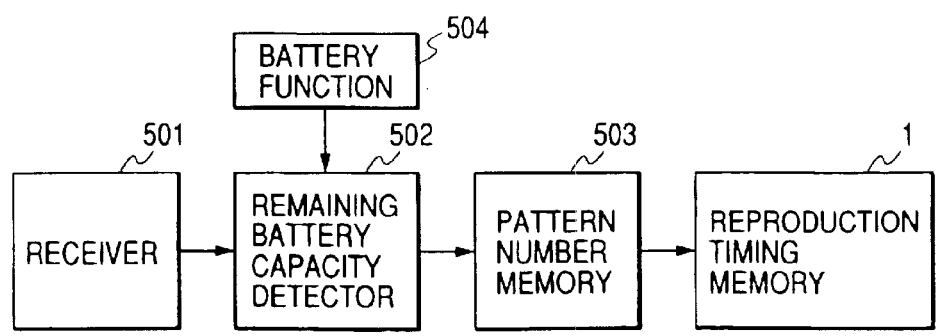

PATTERN NUMBER MEMORY

| REMAINING BATTERY CAPACITY | PATTERN NUMBER | |
|---|---|---|
| FULL | 1 | — 503a |
| FOR 2 MEMORIES | 2 | — 503b |
| CHARGE IS NEEDED | 3 | — 503c |
| ⋮ | ⋮ | |

PATTERN NUMBER MEMORY

| ENVIRONMENTAL NOISE LEVEL | PATTERN NUMBER | |
|---|---|---|
| VERY NOISY | 1 | — 603a |
| RATHER NOISY | 2 | — 603b |
| NO NOISE | 3 | — 603c |
| ⋮ | ⋮ | |

PORTABLE MOBILE UNIT

BACKGROUND OF THE INVENTION

1. Field of the Invention

The present invention relates to a portable mobile unit for alerting a user (or subscriber) of incoming of a signal by means of ringing, and in particular to a portable mobile unit being suitable for alerting of the condition when a phone call is coming in, through such the ringing sound.

2. Prior Art

With conventional cellular phones, it is common to generate the ringing sound for alerting of incoming phone calls, from various tone data which are obtained by coding the tone signals digitally. The users of the cellular phone can easily recognize the incoming call (i.e., arrival of the telephone call) to her/his own cellular phone by the ringing sound. Recently, users of such cellular phones are increasing in number very rapidly, which brings about cases that people having their own cellular phones happen to be within the same place or area very often this results in confusion of the incoming call with that to others, and then there occurs a demand or a necessity for discriminating or differentiating the ringing sound of each the cellular phone from others. For example, a melody generator, which is capable of producing different melodies according to a choice of the user, is widely prevailed and getting popular among cellular phone users to discriminate her/his cellular phone from others'. with which each user can produce her/his own melody, thereby obtaining the discrimination thereof from others. Further, as shown in Japanese Patent Laid-open No. Hei 10-4442 (1998), there is already known an apparatus having a function of renewing the melody by means of download thereof, and also, as shown in Japanese Patent Laid-open No. Hei 08-251258 (1996), there is already known an apparatus having a means for producing its own original sound for alerting of the incoming call, by taking in sounds from an external microphone in advance. Conventionally, for discriminating the ringing sound, a beep sound with its frequency range simply expanded or with its tempo made variable is used so as to enable the melody to sound more natural than that of a previous type using a beep sound which sounds rather mechanical. In addition, an apparatus utilizing a FM sound source, which can play tones of musical instruments by synthesizing the sounds from a sound database is manufactured or put on a market recently. However, this apparatus is designed to synthesize not vocal sounds but particular musical instrumental sounds. Also, a PCM sound source enables to produce the vocal sounds or sound effects (such as, mimic sounds), which can increase the number of the alerting sounds infinitely. However, it brings about a demerit of requiring data capacity too much, particularly, for the cellular phone, which is demanded to be light-weighted and small-sized.

Also, alerting used in another purpose, such as distinguishing callers by changing the ringing sound or by changing a light-emission pattern instead, is shown in Japanese Patent Laid-open No. Hei 09-312684 (1997). This improves utility value thereof, because the user can know who is calling (i.e., a caller) only by hearing the ringing sound.

SUMMARY OF THE INVENTION

An object of the present invention is to provide a portable mobile unit with improved usability, capable of discriminating the ringing sound for alerting of the incoming call sufficiently or enabling the user to grasp various conditions by changing the ringing sound when the telephone call comes in.

According to the present invention, for accomplishing the above-mentioned object, there is provided a portable mobile unit for alerting the user on incoming of a signal by a ringing sound, comprising: a ringing sound generator having a plurality of sound sources therewith; and a controller for controlling operations of the portable mobile unit, wherein the controller controls the ringing sound generator, when the signal comes in, so that it generates the ringing sound with using at least one of the a plurality of sound sources, upon basis of a condition which is set up in advance.

According to a preferable embodiment of the present invention, the ringing sound generator comprises: a memory for storing a plurality of sound data which are generated with different generation methods, respectively; a plurality of reproducer for reproducing the plurality of sound data stored in accordance with the respective generation methods; and a reproduction timing memory for performing selection of the sound data to be reproduced among the plurality of sound data and for storing reproduction timings to form the patterns for the respective sound data selected, wherein the controller controls the reproduction timing means, so as to reproduce the sound data selected in accordance with the reproduction timings, respectively.

Further, according to other preferable embodiment of the present invention, the plurality of sound data contain therein a sound data of a waveform coding method, in which quantization width is set up depending upon a level of amplitude or power, and a sound data of an analytic composition coding method, in which the signal is modeled, so as to be encoded into. With those means mentioned above, while using that which composes a main phrase from the sound data base, such as the FM sound source, the human voices or the like producing the sound effects of the PCM sound source can be used, additionally. Thereby, it is possible to obtain an infinite number of variations, as well as to bring the capacity to be small.

Also, the condition which is set up in advance, includes: when the telephone number of a caller is coincident with the registered telephone number; when a portion of the telephone number (for example, the area code, etc.) of the caller is coincident with a portion of the registered telephone number (for example, the area code, etc.); when a day of incoming of the signal is contained within a period which is set up in advance; when the number of times of the incoming calls in absence is contained within a range of number of times which is set up in advance; when the remaining battery capacity is contained within a range of capacity which is set up in advance, when the signal comes in; when an environmental sound of the portable mobile unit is contained within a condition of sound which is set up in advance, when the signal comes in; when a sound volume level in an environment of the portable mobile unit is contained within a range of sound volume level which is set up in advance, when the signal comes in; and when it is detected that the portable mobile unit is held in a hand of a user, by means of at least either one of a heat sensor and a pressure sensor, etc.

BRIEF DESCRIPTION OF THE DRAWINGS

FIG. 1 is a block diagram of a main portion of a sound data reproduction portion in a portable mobile unit, according to a first embodiment of the present invention;

FIG. 2 is a table of showing a relationship between sound data number and reproduction timing thereof, respectively, in the portable mobile unit according to the first embodiment of the present invention;

FIG. 3 is a block diagram of showing function blocks for performing selection of the pattern number based on a telephone number of a caller, in the portable mobile unit according to the first embodiment of the present invention;

FIG. 4 is a table of showing a relationship between the telephone number of the caller and the pattern number, in the portable mobile unit according to the first embodiment of the present invention;

FIG. 5 is a block diagram of showing function blocks for performing selection of the pattern number based on a time of the incoming call to the portable mobile unit, according to a second embodiment of the present invention;

FIG. 9 is a block diagram of showing function blocks for performing control on the ringing sound based on a condition of sound in an environment of the portable mobile unit, according to a fourth embodiment of the present invention;

FIG. 10 is a table of showing a relationship between a mode and the pattern number, for controlling the ringing sound based on the condition of sound in the environment of the portable mobile unit, according to the fourth embodiment of the present invention;

FIG. 11 is a block diagram of showing function blocks for performing selection of the pattern number based on remaining power of a battery in the portable mobile unit, according to a fifth embodiment of the present invention;

FIG. 17A shows "Ringing sound change menu" display, FIG. 17B "Chang upon telephone number of caller" display, and FIG. 17C a pattern selection display for the ringing sound, respectively.

DESCRIPTION OF PREFERRED EMBODIMENTS

Hereinafter, embodiments according to the present invention will be fully explained by referring to the attached drawings, i.e., FIGS. 1 to 18. In the embodiments that will be mentioned below, explanation will be given on an example, wherein the present invention is applied to, in particular, a cellular phone as one kind of the portable mobile unit.

Figure 15:
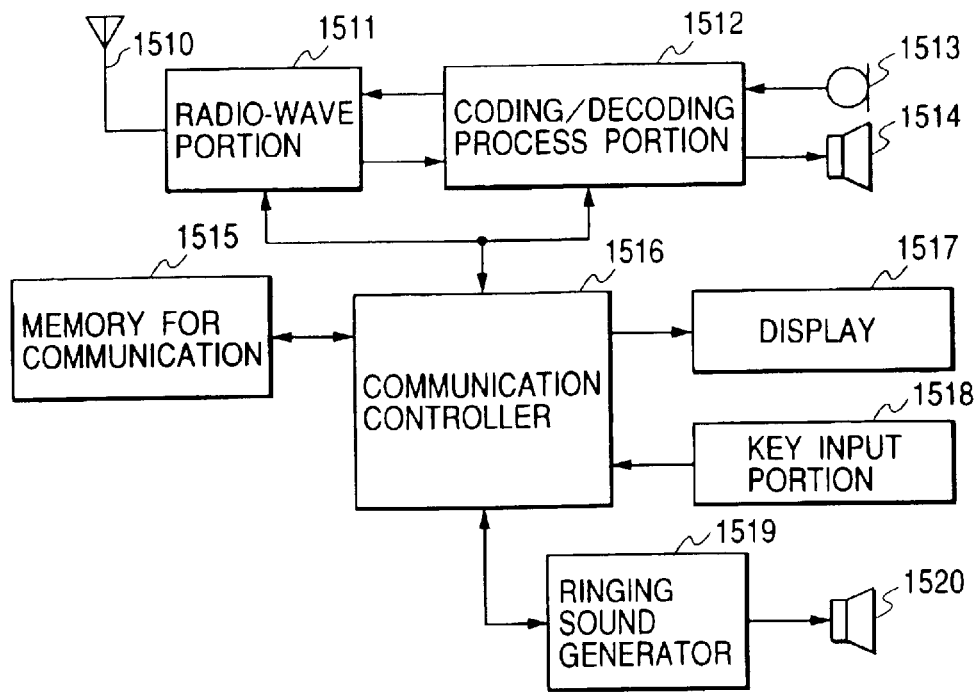
FIG. 15 is a block diagram for showing the structure of the portable mobile unit, according to the first embodiment of the present invention.

The structures of the cellular phone, according to a first embodiment of the present invention, will be shown in FIG. 15, wherein a reference numeral 1510 indicates a transmission antenna, 1511 a radio-wave portion for converting between transmission data and radio-wave signals, 1512 a coding/decoding process unit for converting the transmission data into audio signals, 1513 a microphone, 1514 a receiver, 1515 a memory for communication, holding programs, data, etc., therein, which are necessary for the control of operations as the cellular phone, 1516 a communication controller for controlling the present cellular phone, 1517 a display, and 1518 a key-input portion. A reference numeral 1519 indicates a ringing sound generator for generating the ringing sound when it receives the radio-wave signal, and 1520 a speaker for outputting the alerting signal that is reproduced in the ringing sound generator 1519, audibly. Further, in the explanation given below, "reproduce" means to output a sound data that is stored or a sound data that is received with the incoming call, or to output an audible frequency signal that is converted from an inputted sound data.

FIG. 1 is a block diagram of showing details of the communication controller 1516 and the ringing sound generator 1519 shown in the FIG. 15. The cellular phone in the present embodiment can reproduce a plurality of sound data simultaneously. According to the present embodiment, a plurality of memories are provided for storing the sound data corresponding to a plurality of the sound data methods thereof. In more details, there are provided a sound data memory 3a of the FM sound source, a sound data memory 3b of the PCM sound source and a sound data memory 3c of the MIDI method, and are also provided a sound data reproduction portion 4a of the FM sound source, a sound data reproduction portion 4b of the PCM sound source, and a sound data reproduction portion 4c of the MIDI method, respectively, as the sound data reproduction portions for reproducing the sound data corresponding to those methods. Also, the sound data reproduction portion 4a of the FM sound source, the sound data reproduction portion 4b of the PCM sound source, and the sound data reproduction portion 4c of the MIDI method are connected to the controller 2. The controller 2 selects the sound data to be reproduced from the plurality of the sound data stored in a reproduction timing memory 1, and also determines a reproduction timing for the sound data selected, thereby making the sound data reproduction portion reproduce the selected sound data at the reproduction timing determined, respectively. Outputs of the respective sound reproduction portions are connected to a mixer 5, to be mixed with one another therein, and at the end, they are outputted outside, as the ringing sound for alerting of the incoming call through a speaker 6 (corresponding to the speaker 1520 shown in the FIG. 15), which is connected to the mixer 5.

As is shown in FIG. 2, in the reproduction timing memory 1 are stored sound data numbers to be reproduced and the respective timings for reproductions thereof, etc. With the sound data numbers, it is assumed that No. 1 corresponds to the sound data of the FM sound source, No. 2 to the sound data of the PCM sound source, and No. 3 to the sound data of the MIDI method, respectively. The sound data should not be restricted only to the above, and also the sound data of the MP3 method can be used, and it may be given by No. 4 as the sound data No. thereof, in such the case. Hereinafter, every time when the sound data is further added to, the sound data number, such as No. 5 or No. 6, is allotted to the added sound data. The pattern numbers can be changed depending upon the telephone number of a person who is speaking to, or depending upon the number of times of the incoming calls (i.e., when the telephone calls arrive). Methods and kinds for presetting thereof will be explained in more details, later. The reproduction timing is controlled so as to be ON or OFF status, so that the sound data will be reproduced at ON status, while no sound data at OFF status.

Figure 16:
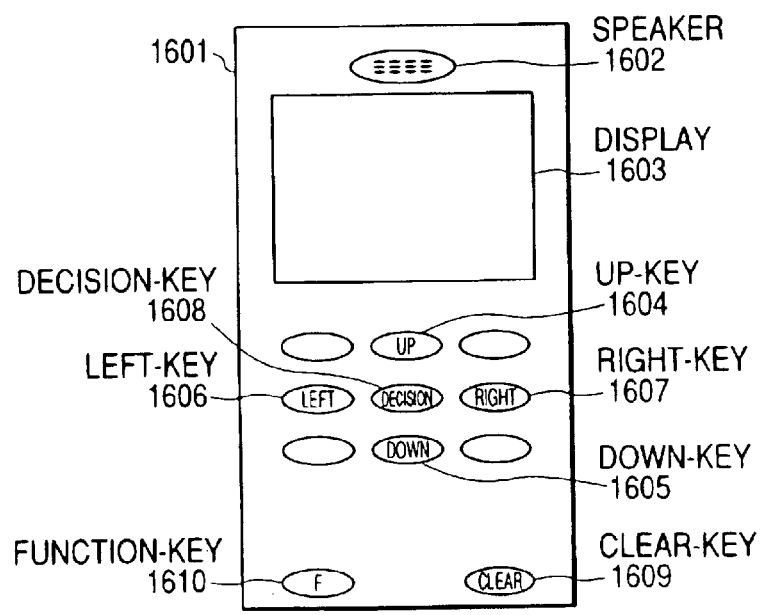
FIG. 16 is a front view for showing an outlook of the portable mobile unit, according to the first embodiment of the present invention.

Next, explanation will be given on the method for presetting the pattern numbers. FIG. 16 is a front view for showing an outlook of the cellular phone, according to the present embodiment. On a front surface (a surface, on which are provided keys, a display, a microphone, a speaker, etc, for operations by a user) of a main body 1601 of the telephone apparatus, a speaker 1602 as a receiver is provided at one end thereof, and in an area from this to the other end thereof are provided a display 1603 and various kinds of keys. The various kinds of keys include therein an up-key 1604, a down-key 1605, a left-key 1606 and a right-key 1607, for shifting a cursor displayed on the display into the up-side, the down-side, the left-hand side and the right-hand side, respectively, a decision-key 1608 for deciding a content that is inputted, a clear-key 1609 for deleting or releasing the content that is inputted, and a function-key 1610 for selecting and executing various functions therewith. To the up-key 1604, the down-key 1605, the left-key 1606, the right-key 1607 and the decision-key 1608 are also assigned a part of numeral number keys for inputting the telephone number and/or time, etc., therewith. At the other end is provided the microphone 1513 as a mouthpiece, however it is omitted shown in the figure.

Figure 17A:
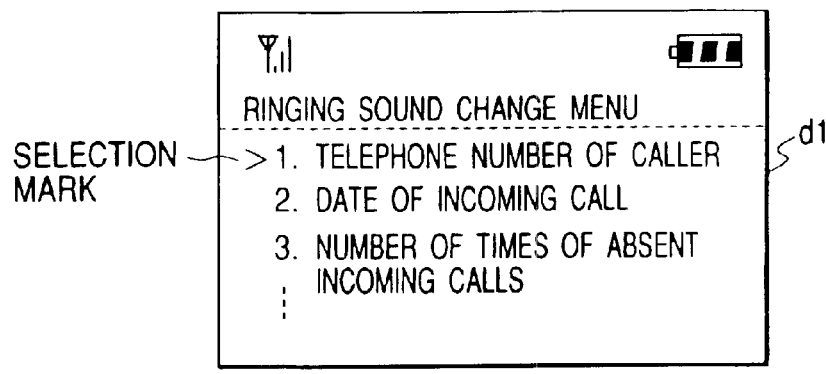
FIGS. 17A, 17B and 17C are views for showing examples of screens displayed when setting up the ringing sound on the portable mobile unit, according to the first embodiment of the present invention, and in particular.
Figure 17B:
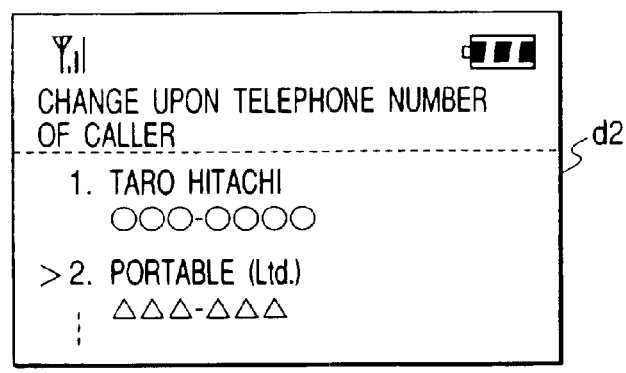
Figure 17C:
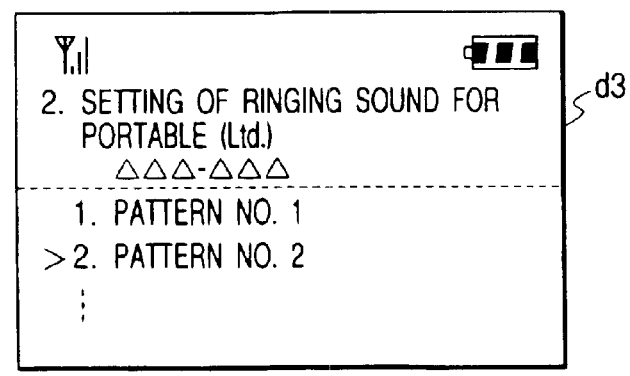

Explanation will be given on a method for changing the ringing sound for alerting of the incoming call, based on the telephone number of the caller, through operations of the above-mentioned keys. Exemplary screens displayed on the display 1603 in this time are shown in FIGS. 17A, 17B and 17C. First, when the function-key 1610 and the key that is assigned to selection for a menu screen are pushed down, then it is shifted to the screen for "menu for changing ringing sound" (d1) shown in the FIG. 17A. On the screen is performed the selection, on which items the ringing sound should be changed, i.e., the change may be made upon the telephone number of the person who is speaking to (i.e., the caller), the time when the phone call comes in, and the number of times of the absent incoming calls. As the cursor for indicating the item to be selected, a sign of inequity, such as ">" is displayed at the left-hand side thereof. Then, by pushing down the up-key 1604 or the down-key 1605, so as to shift the cursor, an edge (i.e., an acute angle portion at the right-hand side, in this case) of the sign of inequity ">" is aligned to the item to be selected. In case of changing the ringing sound for alerting of the incoming call based on the telephone number, "1. Telephone number of a caller" is selected, and the decision-key is pushed down. Then, it is shifted to "screen for changing ringing upon telephone number of caller" as shown in the FIG. 17B (d2). On this screen, pushing down the up-key 1604 or the down-key 1605 shifts the cursor thereof, so as to select the telephone number to be changed in the ringing sound, and pushing down the decision-key can make the selection of the telephone number of the caller. However, it may be also possible to input the telephone number of the caller, directly with using the numeral keys, in the place of the mentioned above. After the selection of the telephone number is made, the screen is shifted to "pattern selection screen for ringing sound" (d3) shown in the FIG. 17C when the decision-key is pushed down, wherein it is possible to select the pattern of the ringing sound for alerting of the incoming call, corresponding to the selected telephone number. The pattern mentioned herein means, as is shown in the FIG. 2, what is reproduced at the predetermined reproduction timing from the sound data generated by the different sound sources. Herein, pushing down the up-key 1604 or the down-key 1605 shifts the cursor, thereby selecting the pattern number at her/his desire. With the cellular phone of the present embodiment, the ringing sound of that pattern is reproduced from the speaker 1602 every time when the pattern is selected, thereby enabling confirmation of the pattern. Herein, by selecting "2. Pattern No. 2" as the desired pattern and by pushing down the decision-key, it is possible to setup the ringing sound for alerting of the incoming call. With the pattern No. 2, as shown in the FIG. 2, the sound data from the FM sound source of the sound data No. 1, the PCM sound source of the sound data No. 2 and the MP3 sound source of the sound data No. 4 are reproduced at the timings shown in the same figure. When it is desired to turn the screen back to the previous one, it can be shifted back to the screen (d2) by pushing down the clear-key 1609 on the screen (d3). In the similar manner, it can be turned back to the screen (d1) by pushing down the clear-key 1609 on the screen (d2).

Next, explanation will be given on the processes up to the reproduction of the sound data, by referring to the FIGS. 1, 2, 3, 4 and 18.

Herein, explanation will be given on an example of the method, where the pattern number is selected upon basis of the telephone number of the caller, thereby to reproduce it.

FIG. 3 is a block diagram of showing function blocks, which are necessary for performing the selection of the pattern numbers upon basis of the telephone number of the caller. Explaining by referring to the circuit constructions of the cellular phone shown in FIG. 15, a receiver 101 for receiving the radio-wave signals corresponds to a receiver circuit portion, which is contained within the radio-wave portion 1511 shown in the FIG. 15, and a telephone number detector 102 to the communication controller 1516 shown in the FIG. 15, which detects the telephone number after demodulation of the radio-wave signals, in accordance with the program stored in the memory 1515 for communication. A portion of the memory area of the memory 1515 for communication shown in the FIG. 15 is assigned as a pattern number memory 103, in which are stored the telephone numbers and the pattern numbers of the ringing sounds for alerting of the incoming calls corresponding thereto, as shown in FIG. 4. In the pattern number memory 103 can be stored the pattern numbers of the ringing sounds for alerting of the incoming calls corresponding to the incoming calls 103a and 103b to the telephone numbers which are preset and stored, or those corresponding to a certain portion of the telephone numbers, such as the incoming calls 103c and 103d to the area code of the telephone numbers of the callers, thereby enabling extensive variations of services responding to the desires from the users. The communication controller 1516 determines the pattern number, corresponding to the telephone number detected, based on the data stored in the pattern number memory 103, and thereafter reads out the reproduction timings corresponding to those pattern numbers based on the data stored in the reproduction timing memory 1 shown in the FIG. 1, thereafter it shifts to the processes for producing the ringing sound for alerting of the incoming call.

Hereinafter, explanation will be given in more details, by referring to a flowchart.

Figure 18:
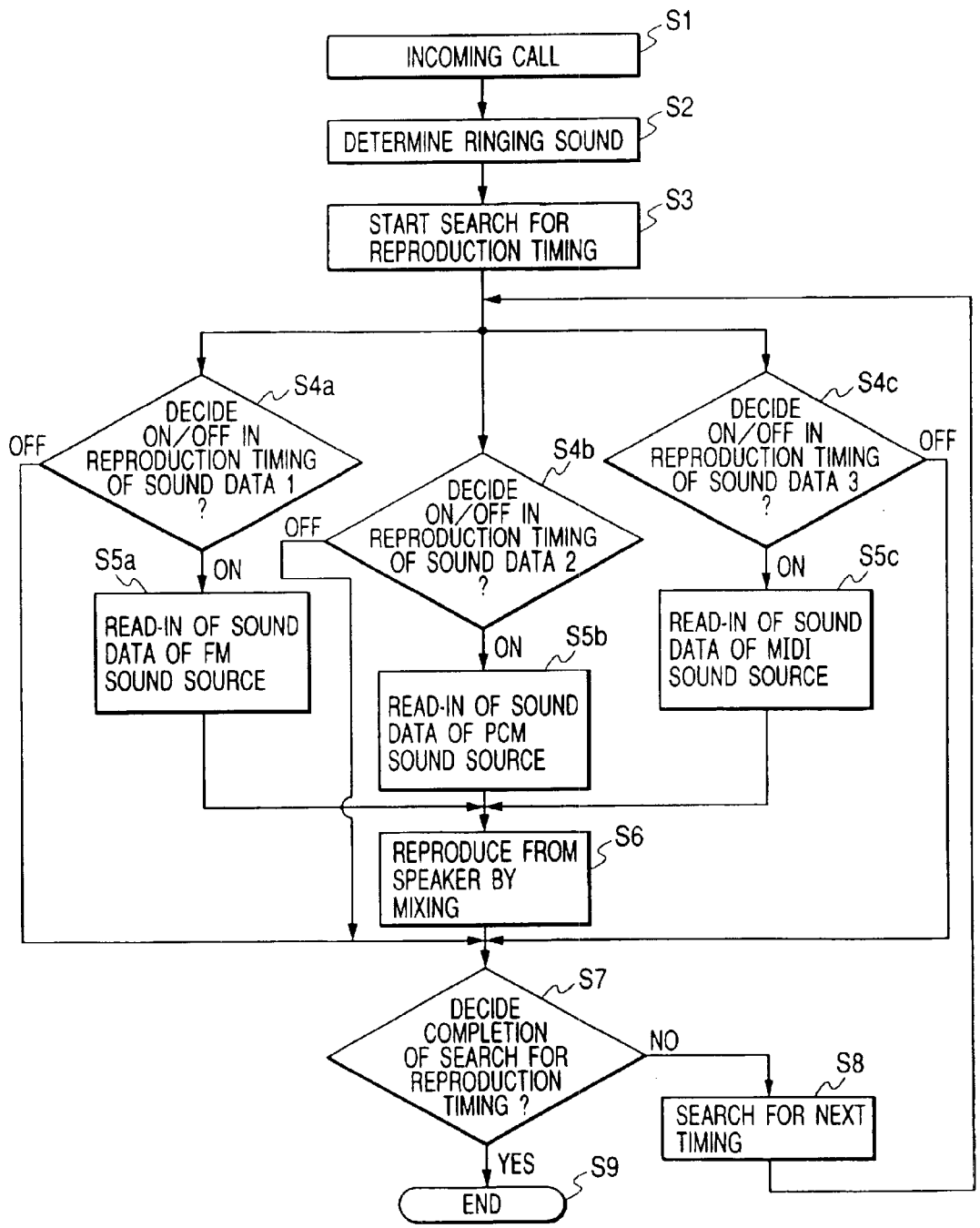
FIG. 18 is a flow chart when the ringing sound thereof is reproduced in the portable mobile unit, according to the first embodiment of the present invention.

In the flowchart shown in FIG. 18, when the telephone call comes in (s1), detection is made on the telephone number of the caller, etc., and the ringing sound for alerting of the incoming call is selected (s2). In a case where the ringing sound is set to be changed depending upon the telephone number of the caller, the receiver 101 receives the radio-wave signal so as to demodulate it, when the telephone call comes in to the cellular phone, as shown in the FIG. 3, and the demodulated signal is sent to the telephone number detector 102, thereby detecting the telephone number of the caller (the person who is speaking to) from the data after being demodulated in the telephone number detector 102. The signal corresponding to that telephone number is sent to the pattern number memory 103, and compared to the telephone numbers stored therein, therefore the pattern number being preset to that telephone number is outputted from the pattern number memory 103. If the telephone number of the caller is "012-345-6789", for example, the ringing sound of the pattern number "1" is reproduced, which is preset to that number as is shown in the FIG. 4, for alerting the user of the incoming call, and then the sound data No. "1", the sound data No. "2" and the sound data No. "3" are reproduced.

Also, it is possible to change the ringing sound for alerting of the incoming call, depending upon each of the areas where the callers live in, by setting up the pattern numbers for each of the area codes to be stored. For example, when the upper three (3) digits are "045", the ringing sound of the pattern number "3" is reproduced for alerting of the incoming call, and then the sound data No. "3" in the FIG. 2 is reproduces.

The controller portion 2 accesses to the reproduction timing memory 1 so as to start a search for the reproduction timings of the respective sound data (s3). The controller 2 checks the reproduction timing for the sound data No. "1" (of the FM sound source) (s4a), the reproduction timing for the sound data No. "2" (of the PCM sound source) (s4b), and the reproduction timing for the sound data No. "3" (of the MIDI sound source) (s4c), respectively. Herein, in the beginning of alerting by the ringing sound to the incoming call (i.e., at a time point a in the FIG. 2), since the sound data No. "1" and the sound data No. "3" are turned ON, and then they are shifted to (s5a) and (s5c), respectively. Since the sound data No. "2" is turned OFF, it is not processed, and is in a condition of search waiting. Into the sound data reproduction portion 4a for the FM sound source, having the sound data No. "1", the sound data 3a of the FM sound source is read in, so as to be sent to the mixer (s5a). In the similar manner, into the sound data reproduction portion 4c for the MIDI sound source, having the sound data No. "3", the sound data 3c of the MIDI sound source is read in, so as to be sent to the mixer (s5c). In the mixer 5, the transmitted sound data are mixed therein and is delivered to the speaker 6. The speaker 6 outputs the transmitted sound data in the form of the audible sound for alerting of the incoming call (s6). Thereafter, a decision is made on whether the search is conducted up to the end or not (s7), and if deciding that the search is necessary for the next reproduction timing, the search is conducted on for the next timing (s8), again.

During the reproduction of the sound data No. "1" and the sound data No. "3", after a minute (for example, at the time point b in the FIG. 2), also the sound data No. "2" is turned to ON at the reproduction timing of the time point b (s4b). Then, into the sound data reproduction portion 4b for the PCM sound source, having the sound data No. "2", the sound data 3b of the PCM sound source is read in, so as to be sent to the mixer (s5b). In the mixer 5, the transmitted three sound data are mixed with one another, and are delivered to the speaker 6. The speaker 6 outputs the sound data in the form of the ringing sound for alerting of the incoming call (s6). Thereafter, decision is made on whether the search is conducted up to the end or not (s7) and if deciding that the search is necessary for the next reproduction timing, the search is conducted on for the next timing (s8), again. In case of deciding that the search is completed up to the end, the reproduction of the ringing sound for alerting of the incoming call is finished (s9). Even in processing of all of those processes, the reproduction of the data of ringing sound for alerting of the incoming call is completed (s9), when the user thereof starts communication by holding the cellular phone in her/his hand.

With taking those steps mentioned above, it is possible to reproduce the sound data, simultaneously, which are stored in accordance with the a plurality of methods. Further, with using such the methods, it is possible to save the memory by setting up the time for reproduction thereof to be short, in particular, even for the sound data of the PCM sound source, which generally needs a large memory capacity. Also, there is a possibility that the circuit scale come to be a little bit bigger, however it is possible to reproduce vocal sounds i.e. human voices or the like by means of that PCM sound source, for example, together with a background of the tones of musical instruments, such as, a piano and/or a guitar, reproduced by the FM sound source. Using a method of composing the sounds from the sound database, such as the FM sound source, for main phrases, it is possible to use the human voices and the like producing the sound effects (such as, the mimic sounds) of the PCM sound source, in addition thereto. With this, an infinite or unlimited number of variations can be obtained when producing the sound for alerting the user of the incoming call, as well as an effect of small-sizing of the capacity. As a result of this, the variations of the ringing sound for alerting of the incoming call comes to be abundant, thereby obtaining the discrimination from the ringing sound of the cellular phone owned by other, with ease.

As an example of the abundance of the variation in the ringing sound for alerting of incoming call, other than those mentioned above, it is possible to store the names of the owners of the telephone numbers which are stored in the pattern number memory, as the sound data of the PCM sound source, in advance, so as to reproduce them in the form of human voices, thereby obtaining the names of the callers, as the ringing sound for alerting them of the incoming call. For example, if the caller's name is "Ieyasu TOKUGAWA" and it is stored as the sound data "Ieyasu TOKUGAWA" corresponding thereto, the sound "Ieyasu TOKUGAWA" is reproduced by the human voice when the call comes in from him. This is also effective even when the caller uses the cellular phone.

In the present embodiment, it is possible to improve the capacity in acknowledging of who is calling to, in particular, by combining the human voices by means of the sound data of the PCM sound sources. When the number is increased in the registrations of the callers, it is very difficult to remember of which ringing sound is assigned to whom. It is in particular true when there are persons having the same family name among her/his colleagues and friends. For example, in a case where Mr. SUZUKI, as the colleague in a company and Mr. SUZUKI, as the friend in her/his hometown, both having the same name, are registered in the cellular phone, the music relating to the company (for instance, a commercial song of the company) and the colleague's name "SUZUKI" are reproduced, at the predetermined timing for the colleague Mr. SUZUKI, while the music relating to the hometown (for instance, a folk music or a music subjecting the area of the hometown) and the friend's name "SUZUKI" are reproduced, at the predetermined timing for the friend Mr. SUZUKI. For example, in the pattern 2, assuming that the sound data 1 is made of the FM sound source, the sound data 2 of the PCM sound source and the sound data 3 of the MIDI sound source, with using the sound data 1 and 3, the music relating to the company is reproduced, and with using the sound data 2, the colleague name Mr. SUZUKI is reproduced, at the reproduction timing b, in the case of the colleague Mr. SUZUKI. While, in the case of the friend Mr. SUZUKI, with using the sound data 1 and 3, the music is reproduced relating to the hometown, and with using the sound data 2, the friend name Mr. SUZUKI is reproduced at the reproduction timing b. With this, in the case where the persons having the same family name are registered, it is possible to make a distinction, at first in the relationship between them (i.e., the colleague of the company or the friend), by means of the sound data 1 and 3, and to reproduce the name by means of the sound data 3, as well, therefore the caller can be acknowledged easily, even in the case where the number of registration is large and the persons having the same name are registered therein.

In a case where the caller uses a telephone apparatus which is connected to the telephones station through a telephone line (including an optical cable), the areas are stored as the sound data of the PCM sound source, to be reproduced in the form of the human voices, thereby it is possible to know the location of the telephone call from the person who is speaking to, when the call comes in. For example, in a case where the area code of the caller is "045" and the sound data "YOKOHAMA" is stored corresponding thereto, it is reproduced as "YOKOHAMA" in the form of the human voice when the call comes in. For example, in the pattern 2 shown in the FIG. 2, assuming that the sound data 1 is made of the FM sound source, and the sound data 2 and 3 of the PCM sound source, the sound data "YOKOHAMA" is stored corresponding to the area code of the caller into the sound data 2, and the caller, for example Mr. SATO, is stored into the sound data 3, thereby it is possible for the user to know that the telephone call comes in from Mr. SATO in YOKOHAMA, by reproducing the "YOKOHAMA" and "SATO" together with the reproduction sound of the sound data 1. In this manner, it is possible for the user to understand who makes the telephone call and/or from where it is made, among the persons registered in advance, by only hearing the ringing sound for alerting of the incoming call, but without answering the telephone, thereby enabling the user to respond it appropriately.

Next, explanation will be given on other example of the method for selecting the pattern number, as a second embodiment, by referring to the FIGS. 5 and 6.

With the present embodiment, with selecting the pattern number based on the time when the call comes in, the change is made in the ringing sound for alerting of the incoming call. The structures of the present embodiment are similar to those of the first embodiment, but except for the control program and the functions of the communication controller 1516 and the contents the pattern number table, which is stored in the memory 1515 for communication. FIG. 5 is a block diagram of showing function blocks necessary for performing the selection of the pattern number based on the time when the call comes in. Explaining by referring to the circuit constructions of the cellular phone shown in the FIG. 15, a receiver 201 corresponds to the receiver circuit portion contained within the radio-wave portion 1511 shown in the FIG. 15, and both a call arrival time detector 202 and a timer function 204 to the communication controller 1516 shown in the FIG. 15. The timer function 204 operates as the clock, in accordance with the program stored in the memory 1515 for communication, thereby outputting the time from it. The incoming call time detector 202 detects the time when the radio-wave signal comes in, by means of an output of the timer function 204 in accordance with the program stored in the memory 1515 for communication, when it receives information indicative of the incoming call time from the receiver 201. A portion of the memory area of the memory 1515 for communication shown in the FIG. 15 is assigned as a pattern number memory 203, wherein the pattern numbers of the sounds for alerting of the incoming calls are stored, corresponding to the times of the incoming calls, as shown in the FIG. 6. With the present embodiment, it is possible to store the pattern numbers of the ringing sounds into the pattern number memory 203, corresponding to the incoming calls 203a and 203b in relation with time zones which are set up and stored. The communication controller 1516 determines the pattern number corresponding to the detected time, based on the data stored in the pattern number memory 203, and thereafter it reads out the reproduction timings of the sound data corresponding to that pattern number, based on the data which are stored in the reproduction timing memory 1 shown in the FIG. 1, and then shifts into the process for producing the ringing sound for alerting of the incoming call. In the FIG. 6 is shown the set-up, for example, in which the pattern No. "1" 203a is applied to when the call comes in a time zone from 0:00 AM to 8:00 AM, while the ringing sound of the pattern No. "2" 203b is reproduced when it comes in from 5:15 PM to 9:30 PM. In more details, in a case where the incoming call time is 1:00 AM, since it falls within a first setting time, from 0:00 AM to 8:00 AM as shown in the FIG. 6, therefore the ringing sound of the pattern No. "1", i.e., the sound data No. "1", the sound data No. "2" and the sound data No. "3" shown in the FIG. 2 are reproduced. Also, when the call comes in at 8:00 PM, since it falls within a second setting time, from 5:15 PM to 9:30 PM, therefore the ringing sound of the pattern No. "2", i.e., the sound data No. "1", the sound data No. "2" and the sound data No. "4" shown in the FIG. 2 are reproduced. With this, it is possible for the user to grasp the present time roughly, by only hearing the ringing sound for altering her/him of the incoming call. As a result of this, since she/he can grasp the time roughly, within her/his various activities in relation to the time, therefore she/he can take action having sufficient time. Also, the ringing sound for alerting the incoming call can be changed depending upon the time zones, therefore it is possible to bring the ringing sound to be suitable for the environments where the user is, for example, by setting up a refreshing ringing sound during the time period from the midnight to the early morning, while setting a gay ringing sound of a large volume during the time period when she/he will be in a noisy place, in particular after 5:00 PM (after the office time).

Also, with using the timer function 204, it is possible to obtain a calendar function by setting a unit of time to be a day or a month. With this, it is possible to make a distinction of a day of the week, or between weekdays and holidays, or to make the change thereof depending upon the months. Further, by setting up the time zone when the call should come in from a specific person, it is also possible to change the call ringing sound depending upon the time difference between the time when she/he has the telephone call actually.

Next, explanation will be given on a third example of the method for selecting the pattern number, as a third embodiment, by referring to FIGS. 7 and 8.

In the present embodiment, with identifying a specific telephone number from those of the callers, the ringing sound is changed, by performing the selection on the pattern numbers depending upon the number of times of the incoming calls in her/his absence from that telephone number. The structures of this embodiment are similar to those of the first embodiment, but except for the control program and the functions of the communication controller 1516, and the contents of the pattern number table, which is stored in the memory 1515 for communication. FIG. 7 is a block diagram of showing function blocks, which are necessary for performing the selection of the pattern number, depending upon the number of times of the incoming calls. Explaining by referring to the circuit constructions of the cellular phone shown in the FIG. 15, a receiver 301 for receiving the radio-wave corresponds to the receiving circuit portion which is contained within the radio-wave portion 1511 shown in the FIG. 15, and a telephone number detector 302 to the communication controller 1516 shown in the FIG. 15, wherein the telephone number is detected, in accordance with the program stored in the memory 1515 for communication, after demodulation of the radio-wave signal, and the number of times of the detected incoming calls in absence is counted up for each of the telephone numbers. Here, "in absence" means the case where no response is made by a receiver even when the ringing sound for alerting of the incoming call is reproduced for a time longer than the preset time period, or by the number being larger than the preset one, when the call comes in, and it means, in particular, in the case of the cellular phone, for example, when the user does not keep it at hand, or when the user turns off the power switch thereof while attending at a conference, seeing a movie, riding on a train, or driving a car, etc., or when the user changes the cellular phone into a manner mode (i.e., vibration mode), etc. A portion of memory area of the memory 1515 for communication shown in the FIG. 15 is assigned as a pattern number memory 303 and an incoming call number memory 304, wherein the pattern numbers of the ringing sounds for alerting of the incoming are stored, corresponding to the number of times of the incoming calls in absence and that of the incoming calls, as shown in FIG. 8. The communication controller 1516 renews the number of times of the incoming calls from the telephone numbers stored in the incoming call number memory 304, by means of increment thereof, when the call comes in from the preset telephone number, in absence.

Figures 6, 7, 8:
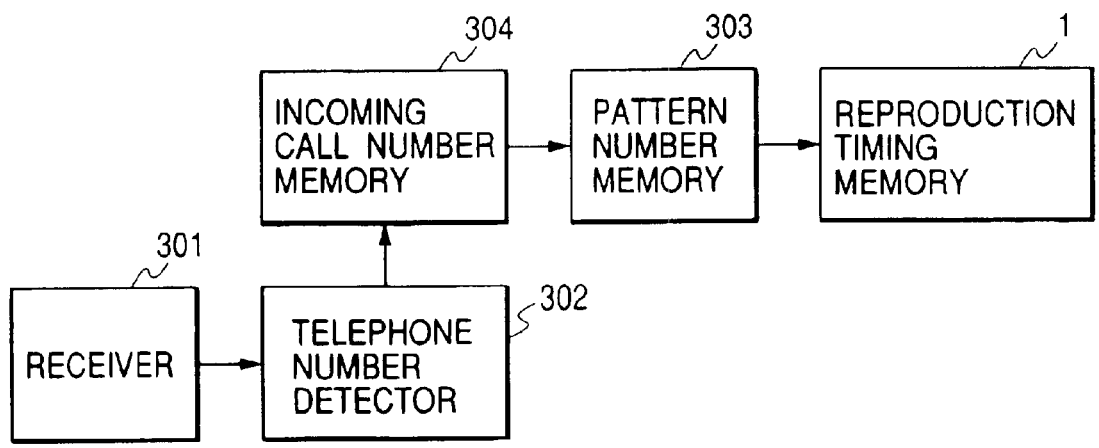
FIG. 6 is a table of showing a relationship between the time of the incoming call and the pattern number, in the portable mobile unit according to the second embodiment of the present invention.
FIG. 7 is a block diagram of showing function blocks for performing selection of the pattern number based on the number of times of the telephone calls from a specific telephone number to the portable mobile unit, according to a third embodiment of the present invention.
FIG. 8 is a table of showing a relationship between the number of times of the incoming calls from the specific telephone number and the pattern number, in the portable mobile unit according to the second embodiment of the present invention.

In FIG. 8, depending upon the number of times of the incoming calls to the specific telephone number that is preset in advance, the pattern No. "1" 303a is applied to when it comes in first time, but when the incoming call is not accepted, i.e., in case where no response is made to it, the pattern No. "2" 303b is applied to if the same telephone number is detected. There is shown the setup, in which, without response to those, further the pattern No. "3" is applied to if the same telephone number is detected at the third time. In more details, when the telephone call comes in at the first time, the ringing sound of the pattern No. "1"

303a is reproduced for it, i.e., the sound data No. "1", the sound data No. "2" and the sound data No. "3" shown in the FIG. 2 are reproduced. Also, when the telephone call comes in at the second time, the ringing sound of the pattern No. "2" 303b is reproduced for it, i.e., the sound data No. "1", the sound data No. "2" and the sound data No. "4" shown in the FIG. 2 are reproduced. And, when the telephone call comes in at the third time, the ringing sound of the pattern No. "3" 303c is reproduced for the it, i.e., the sound data No. "3" shown in the FIG. 2 is reproduced. If a response is made upon it after elapsing a several number of the incoming calls, when the absence is dissolved, the communication controller 1516 sends the pattern number corresponding to that number of times to the reproduction timing memory 1 shown in the FIG. 1, thereafter, and then shifts into the process for producing the ringing sound for alerting the incoming call.

In this case, the mode is so set up that it operates only to the preset telephone numbers, for the purpose of protecting the operation of this mode from the retry operations being troublesome, due to annoying and persistent telephone calls for persuasion, nuisance phone calls, prank calls such as silent telephone calls, etc., and with this, it is also possible to notice emergency and/or importance of the telephone call made, for example, when a member of the family or the relative is in sick.

With using the PCM sound source, it is possible to reproduce wards, such as "This is a telephone call for second time", for the incoming call in absence at the second time from the preset telephone number. In this manner, with setting up the sound of calling people's attention in relation to the increasing number of times, the incoming call comes to be more noticeable, gradually, with the increase of the number of times thereof, and even if the first call is not noticed, the telephone call is accepted with certainty. Also, the number of the times of the incoming calls can be seen, therefore it is possible to understand the emergency and/or the importance thereof from it, thereby obtaining a superior usability.

Also, the program may be changed, so that the communication controller 1516 counts up the number of the ringing in one time of the incoming call from the detected telephone number, in the place of the number of times of the absent incoming calls, so as to stored it into the incoming call time memory 304, as well as, to renew it by increment thereof. In this case, it is possible to change the ringing sound with a lapse of time within the one time of the incoming call. For example, the ringing is made by a gentle sound in the beginning thereof, and is changed to a noisy sound when the number of ringing come to be very large, thereby alerting the user of the incoming call, easily.

Next, explanation will be given on a fourth example of the method for selecting the pattern number, as a fourth embodiment, by referring to FIGS. 9, 10, 13 and 14.

Figures 12, 13, 14:
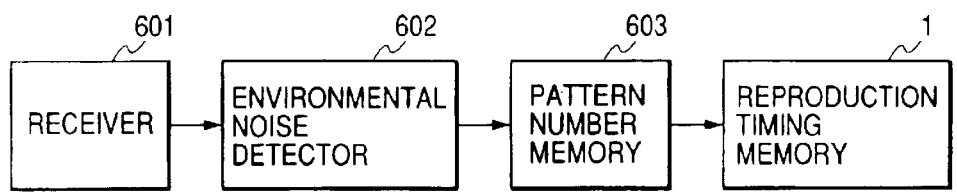
FIG. 12 is a table of showing a relationship between the remaining power of the battery and the pattern, in the portable mobile unit according to the fourth embodiment of the present invention.
FIG. 13 is a block diagram of showing function blocks for performing control on the ringing sound upon the basis a level of noises in the environment of the portable mobile unit, according to the fourth embodiment of the present invention.
FIG. 14 is a table of showing a relationship between a mode and the pattern number for controlling the ringing sound upon basis of the level of noises in the environment of the portable mobile unit, according to the fourth embodiment of the present invention.

With the present embodiment, the mode is set up depending upon the condition of sounds in an environment where the cellular phone is used, and the selection of the pattern number is conducted according to that mode, thereby changing the ringing sound for alerting of the incoming call. In FIGS. 9 and 10, the mode is set up for alerting of the incoming call in a noisy environment where the telephone apparatus is used, such as, on the street in common, or for alerting of the incoming call in a scene or place to be silent, such as in a conference, and the change of the ringing sound for alerting of the incoming call is conducted by selecting the pattern number depending upon that mode. In FIGS. 13 and 14, the mode is set up depending upon a noise level of the environment of the cellular phone that is accepting the incoming call, and the change of the ringing sound for alerting of the incoming call is conducted by selecting the pattern number depending upon that mode. The structures of this embodiment are similar to those of the first embodiment, but except for the control program and the function of the communication controller 1516, and the contents of the pattern number table stored in the memory 1515 for communication. The FIGS. 9 and 13 are block diagrams of showing function blocks necessary for performing the selection of the pattern number based on the sound (noise) condition of the environment. Since receivers 401 and 601, a ringing sound controller 402 and an environment noise detector 602, and the pattern number memories 403 and 603 have functions similar to each other, respectively, therefore explanation will be given only on the representative one shown in the FIG. 9. Explaining by referring to the circuit constructions of the cellular phone shown in the FIG. 15, the receiver 401 corresponds to the receiver circuit portion contained within the radio-wave portion 1511 shown in the FIG. 15, and the ringing sound controller 402 to the communication controller 1516 shown in the FIG. 15, wherein the mode is set up in accordance with the program stored in the memory 1515 for communication, corresponding to the sound (noise) conditions of the environment of the cellular phone, so as to select the pattern number upon that mode. The sound (noise) condition of the environment is decided based on the frequency of sound (noise) detected by a microphone 1513, a level of the sound pressure thereof, a difference between high and low levels in the sound pressure thereof, a continuing time of a certain level of the sound pressure thereof, or a continuing time of sound of a specific frequency range, etc. A portion of the memory area of the memory 1515 for communication shown in the FIG. 15 is assigned as the pattern number memory 403, wherein the pattern numbers of the ringing sounds are stored corresponding to the sound (noise) conditions in the environment of the cellular phone, as shown in the FIG. 6. The relationship between them are also similar to the receiver 601, the environment noise detector 602 and the pattern number memory 603.

In the cases of the FIG. 9 and 10, the ringing sound controller 402 decides the level of the sound pressure, the difference between high and low levels in the sound pressure, the continuing time of a certain level of the sound pressure thereof, or the continuing time of sound of a specific frequency range, etc., so as to decide between the case or place of the noisy environment, such as, on the street in common, and the case or place to be silent, such as in the conference, etc. For example, in the conference, there is the difference between high and low levels in the sound pressure, upon the fact of whether someone makes a statement or not, and the sound within a frequency range of a human voice is detected continuously. Also, in a case of a library, etc., the sound within the frequency range of the human voice is detected continuously too, however the level of the sound pressure is low, and the difference between high and low levels in the sound pressure is small. On the other hand, in the noisy environment, such as on the street, the sound pressure level is large, but the difference between high and low levels in the sound pressure is small, and the sound is detected continuously in a wide frequency range. The ringing sound controller 402 decides the environment of the cellular phone based on, for example, large or small of the sound pressure level, the difference between high and low in the sound pressure level, the continuing time of the sound within a certain sound pressure level, or the difference of the continuing times of the sound within a specific frequency range, so as to determine the mode number, thereby selecting the pattern number corresponding to that mode from those which are stored in the pattern number memory 403. In the pattern number memory 403 are preset the pattern numbers depending upon the setting mode, as shown in the FIG. 10. The set-up of the mode may be made by her/himself appropriately, for example, the mode No. "1" for the case where the environment is noisy, the mode No. "2" for the case where people must be silent, such as in the library, and the mode No. "3" where the incoming call is taken into the consideration, such as in an ordinary room. Herein, the pattern Nos. "1", "2" and "3" are set up depending upon the mode Nos. "1", "2" and "3", respectively.

In the cases of the FIGS. 13 and 14, the pattern numbers are set up, simply corresponding to the sound volume level of noises in the environment of the cellular phone, to be stored in the pattern number memory 603. In those cases, the environment noise detector 602 determines the sound volume level of noises in the environment of the cellular phone upon the sound pressure level of the sound detected by the microphone 1513. In the pattern number memory 603, the pattern numbers are set up corresponding to the environmental noise levels, as shown in the FIG. 14. On the environmental noise level, for example, the range being equal or larger than 60dB in the sound pressure level is set at the mode No. "1" 603*a*, to be felt "very noisy" in the environment for a person who makes that set-up, the range from 59dB to 40dB in the sound pressure level at the mode No. "2" 603*b*, to be felt "rather noisy", and the range being equal or less than 39dB in the sound pressure level at the mode No. "3" 603*c*, to be felt "no noise". Each of those ranges may be set up freely, depending upon the personal feeling of the person who makes that set-up.

Thereafter, the communication controller 1516 sends the pattern number to the reproduction timing memory 1 shown in the FIG. 1, to shift into the processes for producing the ringing sound for alerting of the incoming call.

Herein, for the pattern number corresponding to the cases of noisy environments, a noticeable ringing sound is set up in advance, which can be distinct from the environmental sound, easily. And the ringing sound in the mode, which should be set up in the silent scene, such as in the library, for alerting of the incoming call, is set to be as silent as possible, so that it can be noticed only by her/himself. With this, the ringing sound is reproduced when the phone call comes in, which is set up in advance by her/himself, for fitting to the condition of the environmental sounds (noises).

Also, for the pattern number corresponding to the case that the environmental noise level is felt "very noisy", a high-pitched ringing sound is set up in advance, so that it can be easily noticed. Also, in the case that the environmental noise level is felt to be "no noise", such as in the library, the ringing sound for alerting of the incoming call is set to be as silent as possible, so that it can be noticed only by her/himself. With this, the environmental noise is detected automatically, when the phone call comes in, and the ringing is made by the sound that is set up in advance by her/himself.

As a result of this, it is possible to make the ringing for alerting of the incoming call by an appropriate sound corresponding to the environmental condition, when the phone call comes in. Also, with increasing the number of the mode settings, it is possible to cope with complication in the condition of using the cellular phones by the users.

The present invention should not be restricted only to the above embodiments, but it may be a cellular phone having a heat/pressure sensor for detecting that the user holds it in her/his hand, or a temperature sensor, etc., thereby to change the ringing sound for alerting of the incoming call. When the user holds the cellular phone in her/his hand, there is no necessity of rising up a loud ringing sound for alerting of the incoming call. Then, with mounding the heat sensor for detecting a human body temperature or the pressure sensor capable of detecting the condition of being held in hand, it is automatically detected that the cellular phone is held in her/his hand, thereby to control the ringing sound for alerting of the incoming call to be small. Also, by combining the pressure sensor with the temperature sensor, when the temperature is detected to be equal or higher than 25° C. while not being held in hand, it is decided that the temperature is high, i.e., being located in a hot place or in a hot season, the ringing sound may be changed to one that gives a cool feeling, so as to soften or calm the user's mind. Also, by combining with a photo sensor, it is possible to add a function of making the ringing sound large when the cellular phone lies inside a bag, while making it silent one when it is taken out from the bag to sense the light outside. Also, in recent years, it is inhibited and punished under the law to use the cellular phone in a car. Then, by adding a function of detecting the cellular phone lying inside the car, so as to automatically decide that the car is in driving, by means of an acceleration sensor, it is also possible to automatically change the ringing sound for alerting the user of the incoming call to be small, so that the user cannot notice it, or change it to the mode by the number of times of the absent incoming calls, according to the third embodiment. The above embodiment can be practiced with using an output of the heat sensor, the pressure sensor, the temperature sensor, the photo sensor or the acceleration sensor, in the place of the output of the microphone 1513 provided as the environmental noise sensor in the fourth embodiment.

Next, explanation will be given on a fifth example of the method for selecting the pattern number, as a fifth embodiment, by referring to FIGS. 11 and 12.

With the present embodiment, the ringing sound for alerting of the incoming call is changed by conducting the selection of the pattern number depending upon a remaining battery capacity of the cellular phone. The structures of this embodiment are similar to those of the first embodiment, but except for the control program and the functions of the communication controller 1516 and the contents of the pattern number table stored in the memory 1515 for communication. FIG. 11 is a block diagram for showing function blocks, which are necessary for conducting the selection of the pattern number depending upon the remaining battery capacity. Explaining with reference to the circuit constructions of the cellular phone shown in the FIG. 15, a battery function 504 is a portion for supplying electric power to the apparatus or for storing the electric power charged from a charger (not shown in the figure), a receiver 501 for receiving the radio-wave signals corresponds to the receiver circuit portion contained within the radio-wave portion 1511 shown in the FIG. 15, and a remaining battery capacity detector 502 corresponds to the communication controller 1516 shown in the FIG. 15, which detects the charged battery capacity at present from the battery function 504, upon receipt of an information of the incoming call from the receiver 501, in accordance with the program stored in the memory 1515 for communication. A portion of the memory area of the memory 1515 for communication shown in the FIG. 15 is assigned as a pattern number memory 503, in which the pattern numbers of the ringing sounds are stored corresponding to the remaining battery capacities, as shown in the FIG. 12. In the pattern number memory 503, the pattern numbers are set up and stored, corresponding to the remaining battery capacities obtained in the remaining battery capacity detector 502, as shown in the FIG. 12, so that, for example, the pattern No. "1" 503*a* is applied to when the remaining battery capacity is full, the pattern No. "2" 503*b* is applied to when the remaining capacity is only for two (2) of the memories on the display, and the pattern No. "3" 503*c* is applied to when charging is necessary. After selecting the pattern number corresponding to the remaining battery capacity, the communication controller 1516 sends the said pattern number to the reproduction timing memory 1 shown in the FIG. 1, thereby to shift into the processes for producing the ringing sound for alerting of the incoming call. In this instance, it is also possible to reproduce a voice sound, such as "you can use this about ten (10) minutes more" or "you can use this about three (3) minutes more", corresponding to the remaining capacity of the battery, with using the PCM sound source as the one of the sound data.

In a case when the telephone call comes in, in this manner, the user can grasp the remaining battery capacity only by hearing the ringing sound for alerting of the incoming call. As a result of this, since it is possible to ascertain the remaining battery capacity before telephone conversation, the user can make the telephone conversation in short, or can ask the caller to make a call again after the charging thereof, therefore it is possible to prevent the telephone conversation from being unexpectedly interrupted or cut off. (Conventionally, there occurs a case where the telephone conversation is interrupted or cut off, unexpectedly, when the battery capacity comes to be empty or rare during thereof.) Also, it is possible to make the user strongly notice the necessity of charging the battery of the cellular phone, by setting up the ringing sound for the necessity of charging, so that the user can notice it easily.

Further, the ringing sound for alerting of the incoming call can be changed upon basis of, in the place of the remaining battery capacity, but an electric field of an antenna, remaining memories of address book, an accumulated time of the telephone conversation. With this, the user can grasp the information relating to the electric field of an antenna, the remaining memories of address book, the accumulated time of the telephone conversation, additionally, when the telephone call comes in.

Also, it can be considered that the ringing sound of the cellular phone comes to be consistent with that of other's, accidentally, if the ringing sound is changed corresponding to the environmental conditions. For preventing the ringing sound from that of the other's in such the case, it may be possible to reproduce the name of a user as the sound data of the PCM sound source. For example, assuming that the name of the user is Taro HITACHI, it may be reproduced as "HITACHI", "Taro" or "Taro HITACHI".

In the embodiment in the above, the ringing sound for alerting of the incoming call can be produced with the relatively small capacity, by mainly using an analytical composition coding method (the FM sound source), as well as abundance of the sounds of the music instruments. Accompanying with this, using a wave-form coding method (the PCM sound resource method), such as the sound source method of recording directly from the microphone, makes it possible to obtain an effect that the ringing sound of the cellular phone owned by her/himself is discriminated from that of other's. In this instance, a large data capacity is necessary for holding the data of the PCM sound source, however there can be obtained an effect that the memory capacity can be reduced by using the data of the PCM sound source in addition thereto.

Also, with changing the ringing sound for alerting of the incoming call upon basis of the telephone number of the caller, it is possible to acknowledge the caller in advance. With this, there can be obtained an effect that the user can decide to respond to the caller who seems to have an important matter, or to hold the telephone call that seems to be unnecessary to respond, by only hearing the ringing sound for alerting of the incoming call.

Further, with changing the ringing sound for alerting of the incoming call upon basis of the present time and/or the remaining battery capacity, it is possible to obtain an additional information by only hearing the ringing sound, i.e., grasping the present time roughly or to knowing the remaining battery capacity. Also, with changing the ringing sound for alerting of the incoming call, upon basis of the call number from a specific person, the ringing sound control mode, or the environmental noise level, respectively, it is possible to obtain an effect that the owner can notice the incoming call easily.

According to the present invention, while achieving sufficient discrimination on the ringing sound for alerting of the incoming call, it is possible to obtain the cellular phone, with which the various conditions can be grasped from the change of the ringing sound when the telephone call comes in, therefore having a superior usability.

What is claimed is:

1. A portable mobile unit capable of alerting on incoming of a signal by a ringing sound, comprising:
    a ringing sound generator having a plurality of sound sources therewith;
    a mixer for mixing a plurality of said sound sources; and
    a controller for controlling operations of said portable mobile unit, wherein
    said controller controls said ringing sound generator so as to generate the ringing sound using at least two of said sound sources when the signal comes in.

2. A portable mobile unit capable of alerting on incoming of a signal by a ringing sound, comprising:
    a ringing sound generator having a plurality of sound sources therewith; and
    a controller for controlling operations of said portable mobile unit, wherein
    said controller controls said ringing sound generator so as to generate the ringing sound using at least two of said sound sources when the signal comes in.

3. A portable mobile unit as defined in claim 2, wherein said controller selects one pattern from a plurality of patterns of the ringing sounds, each of which is composed of a combination of said sound sources based on the predetermined conditions, and controls said ringing sound generator to generate the ringing sound, and said ringing sound generator comprises: a memory for storing a plurality of sound data which are generated with different generation methods, respectively; a plurality of reproducer for reproducing said a plurality of sound data stored in accordance with the respective generation methods; and a reproduction timing memory for storing reproduction timings for selection of the sound data to be reproduced among said plurality of sound data and for formation of said patterns for the respective sound data selected, wherein said controller controls said reproducer, so as to reproduce said sound data selected in accordance with said reproduction timings, respectively.

4. A portable mobile unit as defined in claim 3, wherein said plurality of sound data contains sound data of a wave form coding method, in which quantization width is set up depending upon a level of amplitude or power, and sound data of an analytic composition coding method, in which the signal is modeled so as to be coded.

5. A portable mobile unit as defined in claim 2, further comprising a timer, wherein said controller controls said ringing sound generator so as to generate the ringing sound when the signal comes within a time zone which is set up in advance.

6. A portable mobile unit as defined in claim 2, further comprising a calendar function, wherein said controller controls said ringing sound generator so as to generate the ringing sound when the signal comes within a period which is set up in advance.

7. A portable mobile unit as defined in claim 2, further comprising a counter for counting number of times of incoming calls in absence from a specific person, wherein said controller controls said ringing sound generator so as to generate the ringing sound upon basis of a predetermined condition, said predetermined condition is that number of times of incoming calls in absence is contained within a range of number of times which is set up in advance.

8. A portable mobile unit as defined in claim 2, further comprising remaining battery capacity detector for detecting remaining battery capacity of the portable mobile unit, wherein said controller controls said ringing sound generator so as to generate the ringing sound upon basis of a predetermined condition, said predetermined condition is that the remaining battery capacity is contained within a range of capacity which is set up in advance, when said signal comes in advance.

9. A portable mobile unit as defined in claim 2, further comprising a sound detector for detecting condition of sounds, wherein said controller controls said ringing sound generator so as to generate the ringing sound upon basis of a predetermined condition, said predetermined condition is that an environmental sound of said portable mobile unit is contained within a condition of sound which is set up in advance, when said signal comes in advance.

10. A portable mobile unit as defined in claim 2, further comprising sound volume level detector for detecting sound volume level, wherein said controller controls said ringing sound generator so as to generate the ringing sound upon basis of a predetermined condition, said predetermined condition is that the sound volume level in an environment of said portable mobile unit is contained within a range of sound volume level which is set up in advance, when said signal comes in advance.

11. A portable mobile unit as defined in claim 2, further comprising at least either one of a heat sensor and a pressure sensor, wherein said controller controls said ringing sound generator so as to generate the ringing sound upon basis of a predetermined condition, said predetermined condition is to detect that said portable mobile unit is held in a hand of a user, by means of at least either one of said heat sensor and said pressure sensor.

12. A portable mobile unit capable of alerting on incoming of a signal by a ringing sound, comprising:
    a ringing sound generator for generating the ringing sound in accordance with a plurality of patterns made of combination of at least two sound sources; and
    a controller for controlling operations of said portable mobile unit, wherein
    said controller controls said ringing sound generator, so as to generate the ringing sound when the signal comes in, by selecting one pattern from said plurality of patterns.

13. A portable mobile unit capable of alerting on incoming of a signal by a ringing sound, comprising:

a ringing sound generator having a plurality of sound generation protocols therewith; and a controller for controlling operations of said portable mobile unit, wherein said controller controls said ringing sound generator so as to generate the ringing sound using at least two of said sound generation protocols when the signal comes in.

14. A portable mobile unit as defined in claim 13, further comprising a timer, wherein said controller controls said ringing sound generator so as to generate the ringing sound when the signal comes within a time zone which is set up in advance.

15. A portable mobile unit as defined in claim 13, further comprising a calendar function, wherein said controller controls said ringing sound generator so as to generate the ringing sound when the signal comes within a period which is set up in advance.

* * * * *